UNITED STATES PATENT OFFICE.

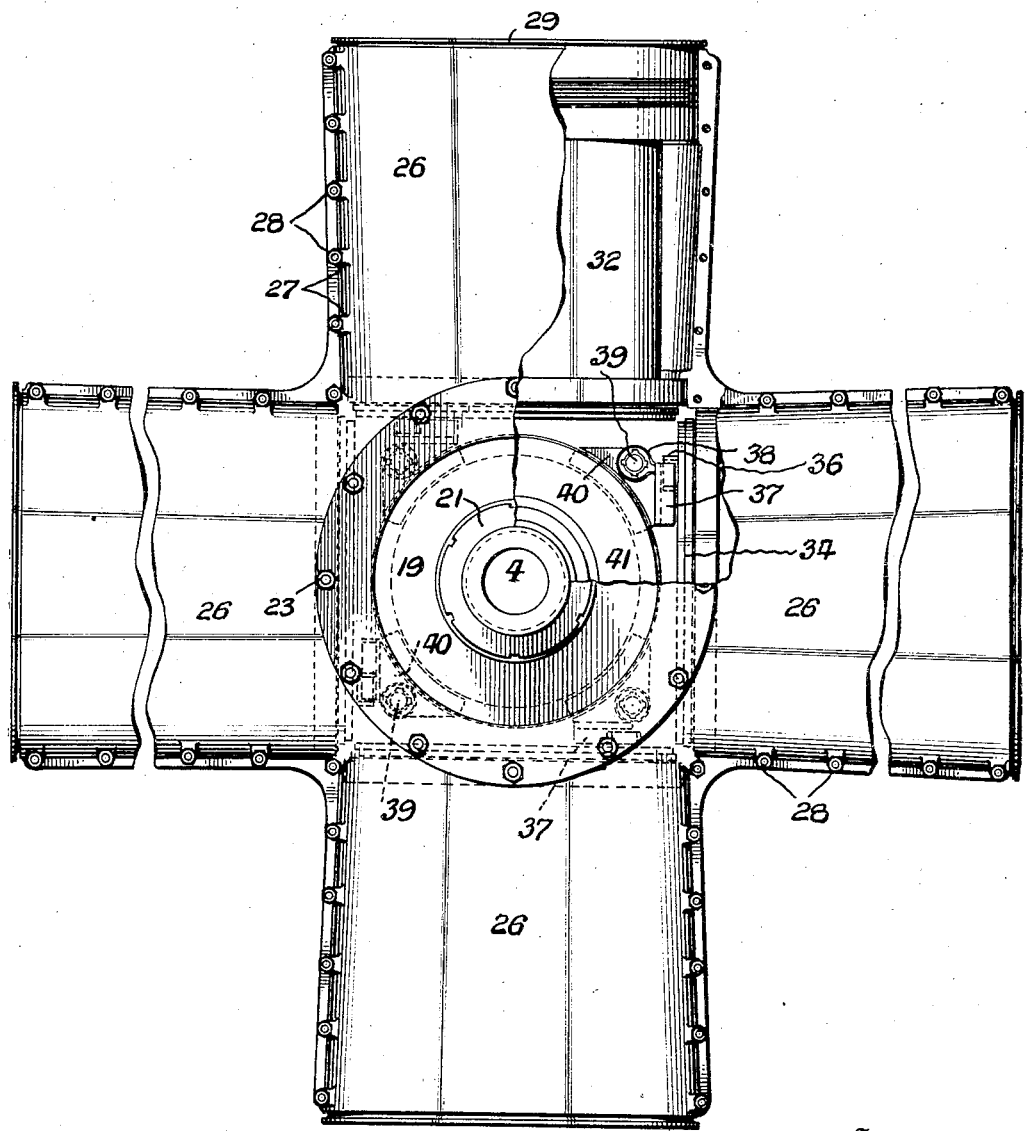

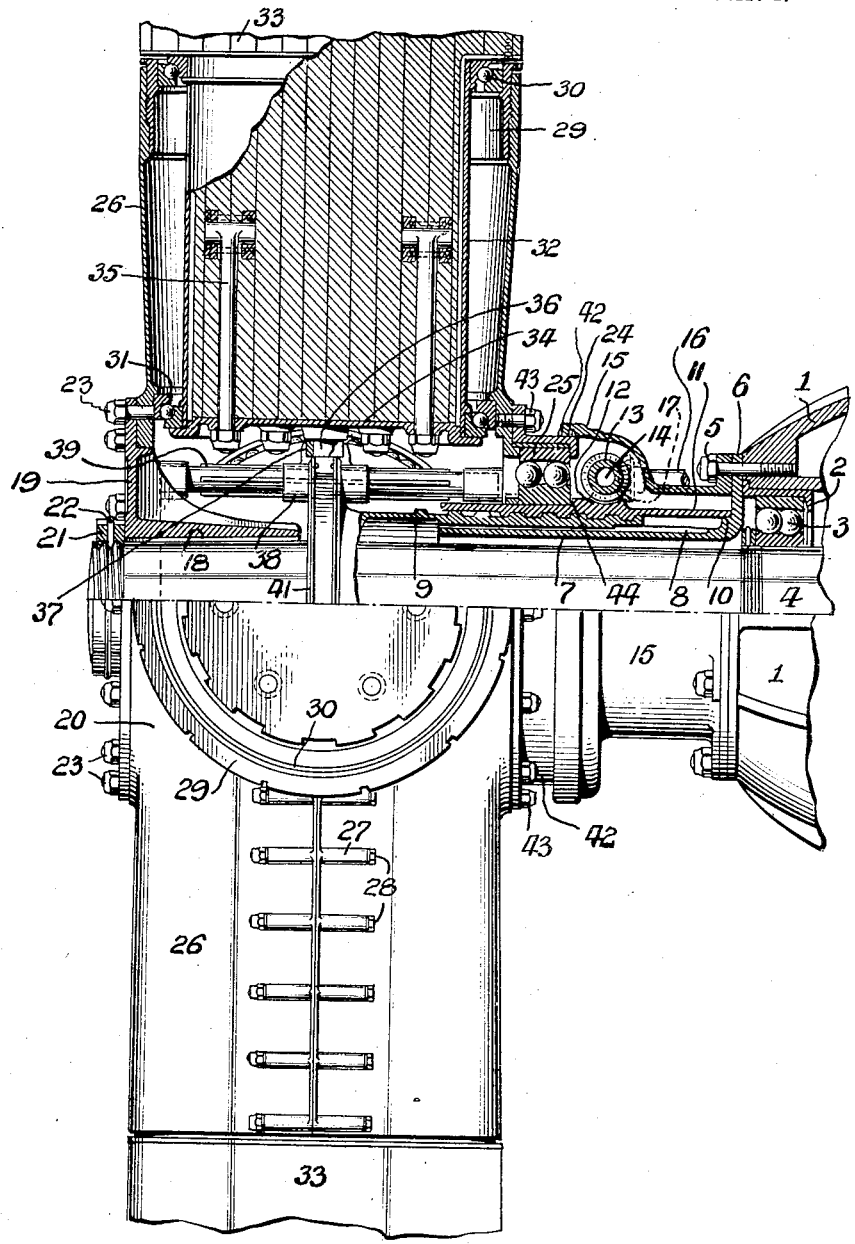

RAYMOND M. HOWARD, OF DETROIT, MICHIGAN.

VARIABLE-PITCH PROPELLER.

1,337,133.

Specification of Letters Patent.  Patented Apr. 13, 1920.

Application filed April 19, 1919. Serial No. 231,252.

*To all whom it may concern:*

Be it known that I, RAYMOND M. HOWARD, a citizen of the United States of America, residing at Detroit, in the county of Wayne and State of Michigan, have invented certain new and useful Improvements in Variable-Pitch Propellers, of which the following is a specification, reference being had therein to the accompanying drawings.

My invention aims to provide a variable pitch propeller with two or more blades especially designed for flying machines, although capable of more general applications, and the primary object of my invention is to provide positive and reliable means, in a manner as hereinafter set forth for effecting a change in the pitch of propeller blades during the operation thereof, so that certain advantages may be derived from such changes, for instance, when starting or stopping airplanes, hydroplanes or dirigible balloons.

Another object of my invention is to provide a propeller for aeroplanes or hydroplanes having blades that may be reversed to serve as a brake or air resisting force when stopping a plane or dirigible balloon.

A further object of my invention is to provide a novel propeller hub in which the blade adjusting mechanism may be embodied without sacrificing strength and rigidity between the propeller blades and the hub.

A still further object of my invention is to provide a variable pitch air craft propeller hub, wherein the parts are constructed with a view of reducing the cost of manufacture, and at the same time retain those features by which safety and ease of assembling are secured.

With such ends in view, my invention resides in the novel construction to be hereinafter considered and then claimed, and reference will now be had to the drawings, wherein—

Figure 1 is a front elevation of a propeller hub, partly broken away, and

Fig. 2 is a side elevation of the same partly broken away and partly in section.

In the drawing, Fig. 2, the reference numeral 1 denotes the front end of a fuselage, body, crank case or engine housing, forming part of an aircraft and provided with a housing 2 for an anti-frictional ball or roller bearing 3 through which extends a propeller shaft 4, which is driven by the engine or power plant of the aircraft.

Connected to the body 1 by screw bolts 5 or other fastening means is the peripheral flange 6 of a bearing sleeve 7, said sleeve surrounding the propeller shaft 4 and having one or more splines or keyways 8 so that a screw sleeve 9 may slide longitudinally of the bearing sleeve and be held against rotation thereby.

Rotatable on an annular shoulder 10 of the bearing sleeve 7 is a nut sleeve 11, said nut sleeve being in screw threaded engagement with the screw sleeve 9, so that when said nut sleeve is revolved the screw sleeve may be shifted longitudinally of the bearing sleeve 7. To accomplish this the nut sleeve 11 is provided with a peripheral worm gear 12 and meshing therewith is a transverse worm 13 on a shaft 14 suitably journaled in a casing 15 connected to the flange 6 of the bearing sleeve 7 by the screw bolts 5. Power may be transmitted to the transverse shaft 14 from a longitudinal shaft 16 through the medium of beveled gear wheels 17, spiral gears or a flexible shaft, and the shaft 16 is adapted to extend rearwardly for operation by the aviator or operator of the aircraft and simply represents conventional means for imparting movement to the shaft 14 from some remote point.

Splined or otherwise keyed on the forward end of the propeller shaft 4, as at 18, is the end plate 19 of a hollow propeller hub 20, said end plate being also retained on the propeller shaft 4 by a nut 21 and a cotter pin or other locking device 22. The end plate 19 is bolted or otherwise connected to the hub 20, as at 23, and the inner end of said hub is provided with a housing 42 held in place as at 43. The housing contains a bushing and an end thrust and radial bearing 25 which serves the nut sleeve 11 by engaging a shoulder 44 thereof. The housing 42 extends into the casing 15, with a dust ring or guard 24 interposed between the inner end of the housing and said casing.

The hub 20 provides a plurality of radially disposed hub sockets 26 and in order that the parts of the hub may be easily manufactured and expeditiously assembled, it is preferable to make the hub and its sockets in two parts divided in a plane at a right angle to the axis of the propeller shaft 4, the hub part having bosses 27 connected to screw bolts, tie rods or other fastening means, generally designated 28.

Screwed or otherwise mounted in the outer ends of the hub sockets 26 are housings 29 for ball or roller bearings 30, and suitably mounted in the inner ends of the hub sockets are antifrictional ball or roller bearings 31, the latter coöperating with the former in supporting the reduced inner ends 32 of propellers blades, said propellers being disposed to rotate in the hub sockets about the axes radiating from the axis of the propeller shaft 4.

The reduced inner ends 32 of the propellers blades 33 are provided with caps 34 suitably anchored, as at 35, and said caps have eccentrically disposed trunnions 36 extending into channels 37 of the guide members 38 that may be slidably keyed on guides or rods 39 supported by the hub 20 and the end plate 19 thereof. The guides 39 are disposed in parallel planes relative to the shaft 4 and correspond in number to the propeller blades, and to impart movement to the propeller blades to change the pitch thereof, it is necessary that the guide members 38 be shifted longitudinally of the guide rods 39 with the trunnions 36 sliding in channel members 37. To accomplish this, the guides 38 are provided with shoes 40 extending into circumferentially grooved head 41 forming part of the screw sleeve 9, as best shown in Fig. 2. When the screw sleeve 9 is reciprocated, the guides 38 are caused to slide on the guide rods 39, and since the axis of rotation of each propeller blade is defined by the hub sockets, it is obvious that the trunnions 36 of the propeller blades must shift in channel members 37 of the guides 38 and during said shifting movement cause the propeller blades to be oscillated relative to the axes thereof, thereby changing the pitch of each propeller blade in a proper direction. The propeller blades have been shown in neutral position and may be oscillated in either direction, as there is sufficient clearance for longitudinal movement of the screw sleeve 9 in either direction within the hollow hub.

The hollow propeller hub 20, housing 42, and the casing 15 afford an inclosure or receptacle in which a suitable lubricant may be placed to insure easy adjustment of the mechanism by which the pitch of the propeller is varied, and this is accomplished without sacrificing rigidity of the propeller blades relative to the hub or displacement of any part which may be subjected to the action of centrifugal force of the propeller when in action.

It is thought that the utility and manner of varying the pitch of the propeller will be understood without further description, and while in the drawings, there is illustrated a preferred embodiment of my invention, it is to be understood that the structural elements are susceptible to such variations and modifications as fall within the scope of the appended claims.

What I claim is:—

1. The combination of a propeller shaft, a hollow hub thereon, propeller blades rotatably held by said hub, a reciprocable sleeve in said hub about the driven end of said shaft adapted to vary the pitch of said blades, a nut sleeved about said reciprocable sleeve adapted to reciprocate said reciprocable sleeve, and means adapted for rotating said nut sleeve and imparting movement to said reciprocable sleeve.

2. The combination of a propeller shaft, a hollow hub mounted thereon and provided with sockets, blades solely supported by said hub and having the inner ends thereof journaled in said hub sockets and provided with trunnions, longitudinal rods in said hub, guides on said rods engaging the trunnions of said blades and adapted to partially rotate said blades, shoes carried by said guides, and reciprocable means common to said guides and surrounding said shaft to receive said shoes and adapted to simultaneously adjust said blades.

3. The combination set forth in claim 2, wherein said means is located at the rear side of the blades and includes a bearing sleeve, a screw sleeve on said bearing sleeve, a nut sleeve on said screw sleeve, and a worm adapted to rotate said nut sleeve.

In testimony whereof I affix my signature in the presence of two witnesses.

RAYMOND M. HOWARD.

Witnesses:
    Karl H. Butler,
    Anna M. Dorr.